United States Patent [19]

Spear et al.

[11] Patent Number: 5,367,658
[45] Date of Patent: Nov. 22, 1994

[54] INTERRUPT MANAGEMENT METHOD

[75] Inventors: Dan Spear, West Hollywood; Larry Mayer, Los Angeles, both of Calif.

[73] Assignee: Quarterdeck Office Systems, Inc., Santa Monica, Calif.

[21] Appl. No.: 957,981

[22] Filed: Oct. 7, 1992

Related U.S. Application Data

[62] Division of Ser. No. 730,244, Jul. 15, 1991, Pat. No. 5,237,669.

[51] Int. Cl.⁵ .............................................. G06F 12/02
[52] U.S. Cl. ..................................... 395/425; 395/400; 364/DIG. 1
[58] Field of Search ... 364/200 MS File, 900 MS File; 395/400, 425

[56] References Cited

U.S. PATENT DOCUMENTS 4,926,322  5/1990  Stimac et al. ...................... 395/500
5,123,098  6/1992  Gunning et al. .................... 395/400

Primary Examiner—Joseph L. Dixon
Assistant Examiner—Hiep T. Nguyen
Attorney, Agent, or Firm—Hecker & Harriman

[57] ABSTRACT

A method of increasing the amount of directly addressable memory address locations that can be allocated to RAM. An initialization routine is executed to identify ROM's in reserved memory address space that are to be reallocated. Suitable address space in extended memory is located and the ROM's are mapped into extended memory address space. A ROM access interceptor routine is implemented to trap ROM accesses and direct them to the reallocated address space. A ROM access handler routine is implemented to contain the ROM execution and to restore the computer system to a condition where it can continue execution of application or system software after the ROM access is completed. Memory addresses in reserved address space formerly allocated to ROM's can be reallocated to RAM or other memory devices.

7 Claims, 12 Drawing Sheets

INTERRUPT MANAGEMENT METHOD

This is a divisional of application Ser. No. 07/730,244 filed Jul. 15, 1991, now U.S. Pat. No. 5,237,669.

BACKGROUND OF THE PRESENT INVENTION

1. Field of the Invention

This invention relates generally to the field of computer memory systems and in particular to a memory management system for control and optimization of computer memory use.

2. Background Art

A typical computer system consists of a number of modules or components. Computer systems typically include a central processing unit (CPU) such as a microprocessor. The microprocessor is a program-controlled device that obtains, decodes and executes instructions. A computer system also includes storage components for storing system operating software, application program instructions and data. These storage components may be read only memory (ROM), random access memory (RAM), disk or tape storage, or any other suitable storage means.

A computer system typically also includes input/output (I/O) components for connecting external devices to the microprocessor. Special purpose components, such as memory management units or co-processors, may also be part of the computer system.

Computers are used to process data. To allow processing of data, input data must be stored until it is to be used by the central processing unit (CPU). Also, output data must be stored after it has been processed. During some processing operations, the CPU may also require the storage of data temporarily while instructions are executed on that data. In addition, the application program that controls the processing and the operating system under which the program runs must be accessible to the CPU. This information is made available to the CPU by storing it in a resource known as "main memory".

The memory component known as main memory is a scarce resource that is dynamically allocated to users, data, programs or processes. Main memory is typically a silicon-based memory such as a RAM. In many applications, dynamic random access memory (DRAM) is used as the main memory. Processor main memory is "byte" organized. That is, memory is arranged as a sequence of 8-bit bytes and the byte is the smallest unit of information accessed out of the memory. In one convention, an entire row is selected by a row address and columns are accessed in groups of 8 bits. In some implementations, 16-bit words (2 bytes) or 32-bit words (4 bytes) are accessed at one time.

In order for the main memory to be accessible to the CPU, it must be connected either directly or indirectly to the CPU. The amount of main memory which can be connected directly to the central processing unit is limited by the width of the CPU's address bus. The address bus is connected between the CPU and memory. To access memory, the CPU may place a value on the address bus which uniquely represents a single memory location. The number of unique values which may be placed on the address bus depends upon the width of the address bus. Since the width of the address bus for a particular type of CPU, such as a particular microprocessor, is usually fixed, the number of memory locations which are addressable by the CPU is limited.

Sometimes it is desirable to connect more memory to a CPU than can be addressed by the CPU. To allow the connection of additional memory, a method is used to indirectly couple additional memory to the CPU. Microprocessors such as the 8088 and 8086 have a 20-bit address bus. Since the number of memory locations addressable by an n-bit address bus $2^n$, the number of memory locations addressable by a 20-bit address bus is $2^{20}$, which is equal to approximately one million (1M). In order to be directly accessible to the CPU, all memory must be located within a contiguous block of a size no greater than the number of unique values which may be represented by the bits of the address bus. With a 20-bit address bus, all memory must lie within a contiguous 1M block.

Although it is theoretically possible to access additional memory by some indirect method, most operating systems support only direct access to memory. If the operating system does not support indirect methods for accessing additional memory, an application program and all of its data, along with all necessary system software, must be contained within the contiguous directly accessible block.

While the width of the address bus limits the amount of directly accessible memory, the amount of memory occupied by the system software limits the amount of free memory for application programs to use. Thus, the amount of memory available for application programs will be less than the total amount which is directly accessible. When application programs require more memory than is available for them, a method must be found found for increasing the amount of easily accessible memory available.

In the prior art, a number of attempts have been made to increase the amount of available memory. One method used in the prior art is known as expanded memory specification (EMS). EMS divides a pool of memory which is not directly accessible, known as expanded memory, into pages. By switching the expanded memory one page at a time into the address space which is directly accessible by the CPU, EMS is able to access a virtually unlimited amount of memory. However, EMS takes time to change pages. If the desired data is not in the EMS page frame located in directly accessible memory, EMS must page out the current contents of the page frame and page in the page from expanded memory which contains the desired data. Since such a page change requires time, the processing speed of the computer is reduced. Also, EMS is not generally applicable to all application software. Application software must be written specifically to take advantage of EMS if it is available.

Another method used in the prior art relies on the LOADALL instruction. The LOADALL instruction is an unsupported instruction which is implemented only on the 80286 microprocessor. Since the LOADALL instruction is implemented only on the 80286, this prior art method is only useful in computers based on the 80286 microprocessor.

Another method of the prior art involves the examination and reprogramming of the system software contained on the system ROM. Under this method, the system ROM can be reprogrammed to perform its function while occupying a minimum amount of memory. This method allows the memory space that was wasted because of inefficient ROM programming to be used for other purposes. However, this method requires manual reprogramming of each revision of each ROM with which the method can be used.

All of these prior art methods have disadvantages. Some of these methods provide additional memory, but result in degraded performance of the computer system because of the steps required to make the desired data accessible. Other methods are useful only on systems based on a particular central processing unit. Some methods are ROM-specific and must be separately implemented for each revision of each ROM. Other methods are specific to particular applications programs and cannot be generally applied to all application software.

SUMMARY OF THE PRESENT INVENTION

The present invention provides additional available memory within the directly accessible address space of the CPU. Since the present invention is not CPU, ROM nor application program specific and does not degrade performance as much as the methods of the prior art, the present invention avoids the disadvantages of the prior art and offers more general applicability as well as better performance.

In the present invention, the system software contained in ROM is moved out of its normal address space, and that address space is used for other purposes. The present invention manages memory in a manner which allows the use of ROM address space for other purposes while still allowing access to software contained in ROM.

In the preferred embodiment of the present invention, ROM containing system software is mapped into extended memory address space and accessed in the protected mode. Extended RAM is then mapped into the address space where the ROM's were originally located. The preferred embodiment of the present invention also provides for any attempted ROM accesses to be redirected to the relocated ROM image and for the extended RAM mapped into the original ROM address space to be used for other purposes, such as application programs.

The preferred embodiment of the present invention is a method for increasing the amount of memory which is addressable within the normal memory addressing range of a CPU, thus allowing direct and easy access to data. The preferred embodiment of the present invention relocates system ROM's and video ROM's, but could be applied to other ROM's, as well.

In the present invention, an initialization routine is executed to map the ROM's into external memory address space. An intercept routine is installed to intercept any ROM accesses. Extended RAM is located and allocated to be placed in the address space previously occupied by the ROM. Once installed, normal application programs may be executed on the computer system. The additional RAM, which is located in the original ROM address space, may be allocated for use by applications programs or for other purposes, including, but not limited to, the relocation of terminate-and-stay resident (TSR) programs. When an access to the ROM is attempted, the ROM access interception routine intercepts the access attempt and redirects it to the relocated ROM image. When a relocated ROM routine is called, its execution is monitored to ensure that it does not attempt to access ROM data tables or subroutines in the original ROM address space, which would result in a system crash. After execution of the relocated ROM routine has been completed, any results from the ROM execution are examined and conditioned to eliminate any inaccurate data which might result in an error or crash of the system. By operating in a manner which does not significantly degrade performance and which is not limited to a specific CPU, ROM or application program, the present invention provides a much more efficient and generally applicable method for increasing the amount of available memory in a computer system which is easily accessible to the CPU.

DETAILED DESCRIPTION OF THE PRESENT INVENTION

A method for providing additional easily accessible memory in a computer system is described. In the following description, numerous specific details, such as type of computer system, memory address locations, amounts of memory and bus widths, etc., are described in detail in order to provide a more thorough description of the present invention. It will be apparent, however, to one skilled in the art, that the present invention may be practiced without these specific details. In other instances, well-known features have not been described in detail so as not to unnecessarily obscure the present invention.

Figure 1:
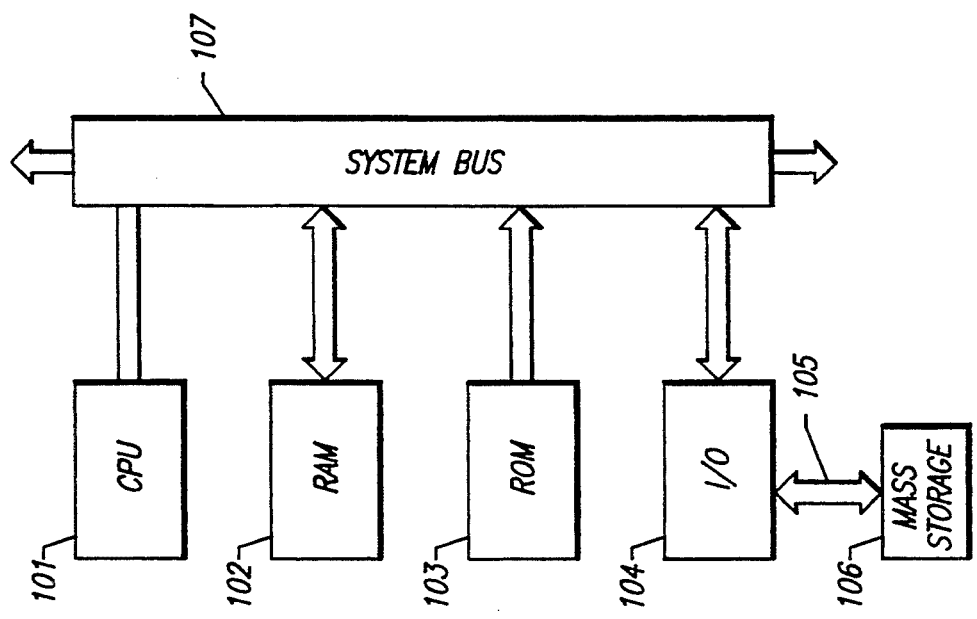
FIG. 1 is a block diagram illustrating the structure of a typical computer system.

A typical computer architecture is illustrated in FIG. 1. The computer system includes a CPU 101, RAM (main memory) 102, ROM (read only memory) 103, and I/O (input/output) 104 all coupled to system bus 107. The I/O block 104 provides access to other systems such as mass storage 106 through bus 105.

The CPU 101 controls the computer, executes instructions and processes data. The CPU 101 communicates with the other components via the system bus 107. The CPU receives input data from the other components of the computer over the system bus 107 and sends output data to the other components of the computer over the system bus. The system bus 107 usually includes an address bus, a data bus and various other control lines. The width of the address and data buses, as well as the number and type of control lines, varies from one computer system to another.

Each component of the computer system, including RAM 102, ROM 103, and memory mapped I/O 104, contains a number of individual memory locations. To allow the CPU 101 to access these locations, each location is assigned a specific address. Each address is a specific combination of binary values which can be transmitted over the address bus. Since most memory devices include more than one location, addresses for all of the locations of a single memory device are usually assigned as a contiguous block. These blocks are often assigned addresses (mapped into memory) in a contiguous manner, as well. However, there may be gaps of unassigned addresses or addresses reserved for future use.

Figure 2:
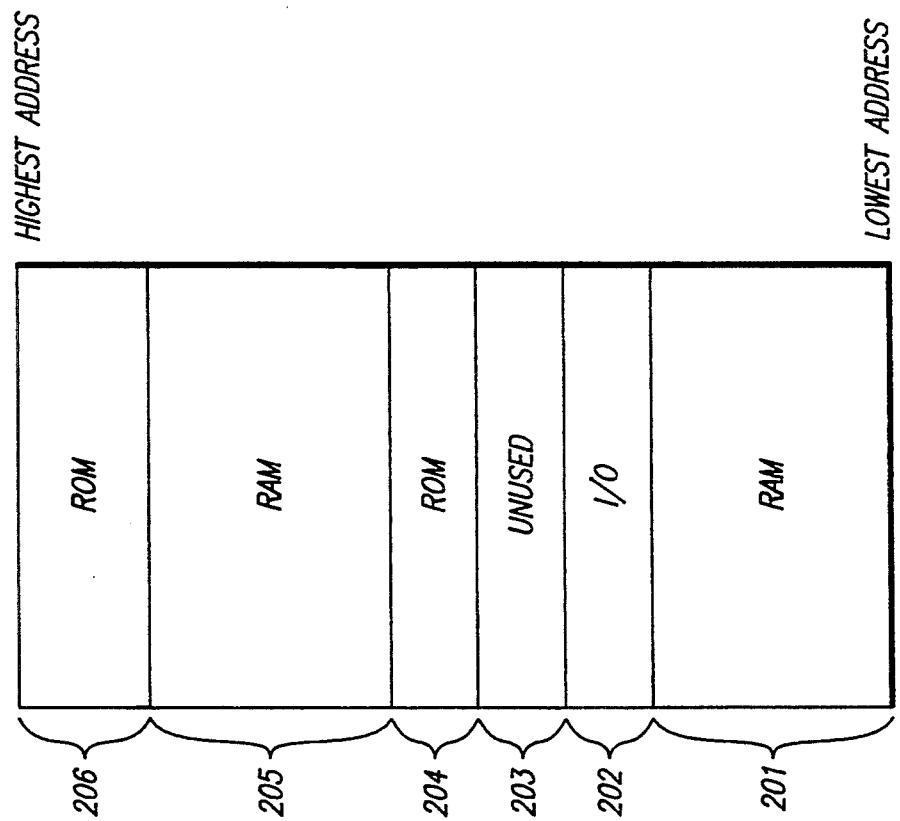
FIG. 2 is a memory map illustrating a possible memory organization of a computer system.

A memory map is useful for understanding the organization of the memory in a computer system. A typical memory map begins at the lowest address accessible to the microprocessor and extends through the highest address accessible to the microprocessor. An example of a memory map is shown in FIG. 2. The lowest addresses of memory on the map in FIG. 2, identified as region 201, is allocated to main memory RAM 102. The next higher addresses, identified as region 202, is allocated to I/O 104. Memory addresses identified as region 203 are unused. Above the unused addresses, region 204 includes memory addresses allocated to ROM. Regions 205 and 206 are memory addresses allocated to additional RAM and ROM respectively. FIG. 2 is provided only as an example to illustrate the freedom with which the memory architecture of a computer system may be designed. It does not represent the actual memory map of any particular computer system.

The operation of a computer system is controlled by a series of instructions known as the "operating system". The operating system is used to control basic functions of the computer system, such as input/output, and is typically stored in a mass storage device, such as disk drive, or in ROM. Examples of operating systems include MS-DOS or PC-DOS.

Computer systems are used to execute application programs. Examples of application programs include word processors, spreadsheets, drawing programs, databases, etc. Certain application programs may be stored in ROM. Generally, however, application programs are stored on a mass storage device, such as a disk drive.

When a computer system is initialized, application programs that are to be executed by the CPU 101 are also transferred from mass storage 106 into RAM 102. Data that is to be acted on by the CPU 101 is also stored in RAM 102.

The size and amount of application programs, the size of the operating system, and the amount of data that are accessible to CPU 101 is limited by the size of main memory. An infinite amount of memory would be ideal, but is impossible both economically and technically. First, there is a limit to the amount of memory which the user can afford. Second, there are technical limitations to the amount of memory which a particular computer can support. The amount of memory supported by a particular computer is dependent on the particular type of CPU upon which the computer is based.

For example, the IBM Personal Computer is based on the 8088 microprocessor. The 8088 microprocessor has a 20-bit address bus. The amount of memory addressable by a computer is a function of the width of its address bus. A CPU with an n-bit address bus can directly access $2^n$ bytes or words of memory. Thus, an 8088 microprocessor can directly access approximately one million memory bytes or words (1M). Although methods have been developed to allow indirect access to additional memory beyond the limits of the CPU's address bus, such methods are often cumbersome and inefficient. Thus, it is desirable to keep as much of the directly accessible memory space available for use by the application software to allow the application software to operate as efficiently as possible.

Although it would be ideal to reserve as much directly-accessible memory space as possible for the application software and to keep the application software as small as possible to ensure that it fits within the directly accessible memory space, these goals are not always feasible. Since system software is required for the management and control of application software, it, too, must also reside in memory. Also, as the complexity of application software and the amount of user data increases, application software requires more memory.

In addition, programs known as TSR's (terminate and stay resident) are often used on computer systems. Such programs provide "hot keys" and "pop-up windows" and are used to perform background tasks, such as displaying a clock in the corner of the video display or monitoring disk drive activity. TSR's have been written for many other applications, and users often desire to have several TSR's resident on their computers simultaneously. Since each TSR requires memory space in which it is located, adding TSR's to the system also increases memory requirements.

Figure 5:
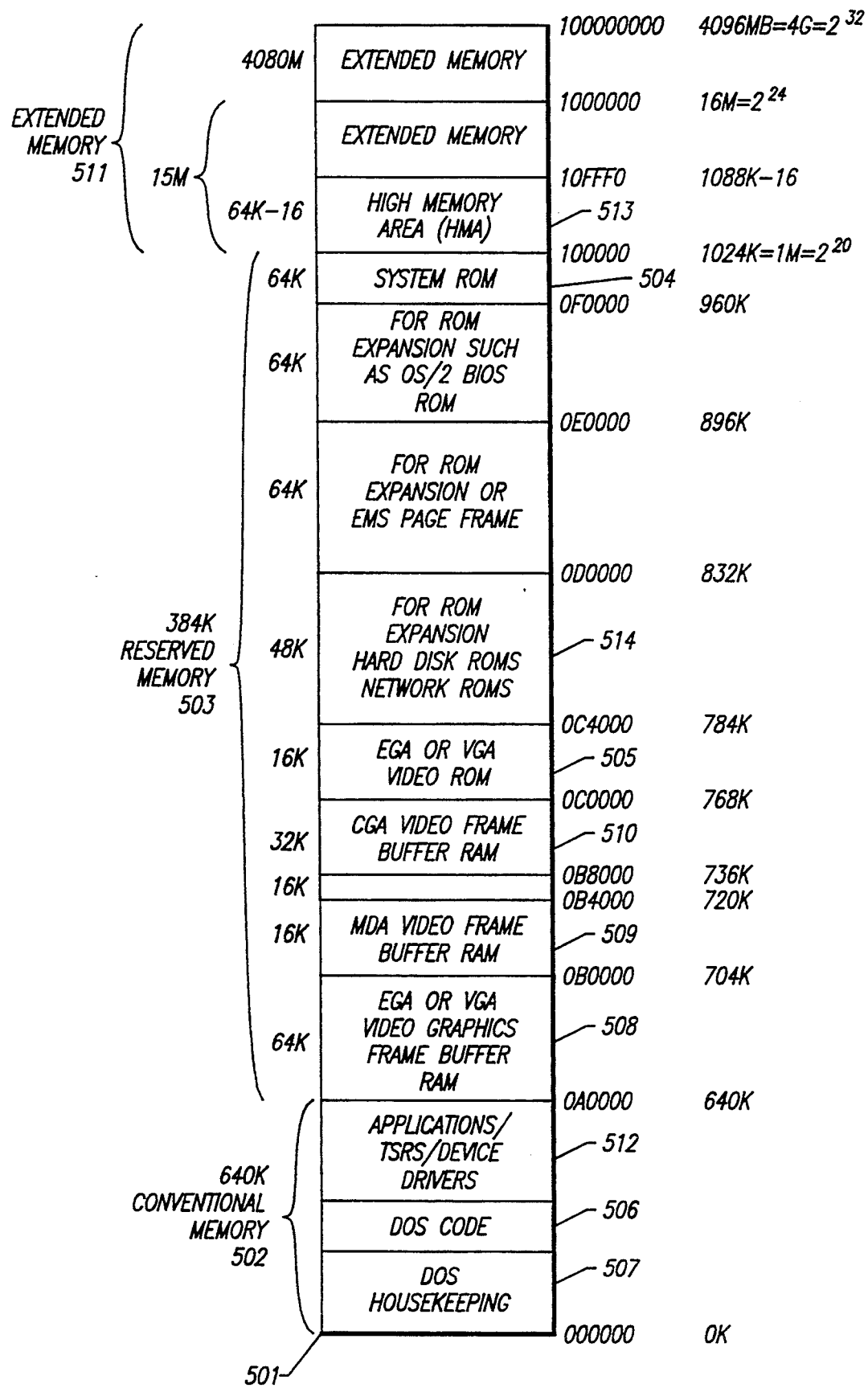
FIG. 5 is a memory map illustrating the memory organization of a typical computer system.

FIG. 5 illustrates a memory map of a typical computer, namely, a computer based on the 8088/8086 family of microprocessors and operating under MS-DOS, such as an IBM Personal Computer. The memory map of FIG. 5 is not the only possible memory map, but is an example of a typical memory map. The memory map is organized from the bottom up, with memory location zero (501) at the bottom, continuing through the highest location in memory at the top. The memory map has three basic areas. The first area includes the lowest 640K of memory and is referred to as conventional memory 502. Conventional memory 502 consists entirely of RAM, which allows both read and write operations, although not all systems include the entire 640K, and some memory space may be left unused.

Early microcomputers had 16-bit address buses, which provide 64K of address space. As the amount of memory required by applications increased, microcomputers had to overcome the limitations of a 16-bit address bus. Thus, the IBM Personal Computer was introduced with a segmented addressing scheme which supported a 20-bit address bus. A 20-bit address bus provides 1024K, or 1M, of address space, which is 16 times that of a 16-bit bus. 1M seemed to be an extraordinarily large amount of memory compared with the 64K of computers with 16-bit address buses. In addition, due to the high cost of memory circuits at that time, an artificial limit for RAM memory was placed at 640K. The 384K of address space from 640K to 1M was reserved for future use, primarily for ROM's. Since subsequent models of computers have been designed to be backwards-compatible with the original IBM PC and to use the same PC-DOS MS-DOS operating system, the 640K limit continues to constrain the amount of memory available to applications on modern computers.

Conventional memory 502 is an important part of a computer system. Conventional memory is used to store system software, application software, user data and other code and data, including TSR's and device drivers. As illustrated in FIG. 5, MS-DOS uses the lowest portion of memory to store its own code 506 and associated data 507. Above that, MS-DOS stores application software, TSR's and device drivers, collectively illustrated as element 512.

The second basic area of memory is the 384K of reserved memory 503, which lies in the memory addresses above the 640K RAM limit and 1024K. The reserved memory area 503 is occupied mainly by ROM's, which are read only devices. The ROM's found in the reserved memory area include the system ROM 504, video ROM 505 and perhaps ROM 514 for other peripheral devices, such as hard disk drives or network interfaces. The system ROM 504 contains code and data which support basic functions of the computer. Video ROM 505 contains code and data to support operations involving the video display. ROM's 514 for other peripheral devices support the operation of those devices.

In addition to ROM's, the reserved memory area 503 also includes other types of specialized memory. One type of memory found in the reserved memory area 503 is RAM used for video frame buffers. A video frame buffer is used to store the information which is currently being displayed on a video display. Information can generally be both read from and written to a video frame buffer, but the video frame buffer cannot usually be used to store general information since any information written to the video frame buffer will alter the appearance of the video display, unless the video frame buffer is inactive and remains so.

The areas of reserved memory 503 used for video frame buffers depends upon the particular type of video display adaptor installed on a particular computer system. As illustrated in FIG. 5, if an EGA or VGA video adaptor is installed, a 64K video frame buffer 508 used for graphics occupies memory space from 640K to 704K. EGA or VGA adaptors also use a 32K video frame buffer for display of text. This 32K video frame buffer is located from 704K to 736K for monochrome displays and from 736K to 768K for color displays. If an MDA video adaptor is installed, a 16K video frame buffer 509 occupies memory space from 704K to 720K. If a Hercules video adaptor is installed, a 64K video frame buffer occupies memory space from 704K to 768K. If a CGA video adaptor is installed on the system, a video frame buffer 510 occupies 32K of memory space from 736K to 768K. If an EGA or VGA display adaptor is installed, an additional amount of memory is used for video ROM. Typically, 16K of memory space from 768K to 784K is used for EGA or VGA video ROM 505, although video ROM 505 may be of a different size and/or located in a different address space.

System ROM 504, which supports the basic operations of the computer, typically occupies, for example, the highest 64K of the reserved memory area 503 from 960K to 1024K. The remaining space in the reserved memory area 503 is either unused or used for other purposes, including ROM's which support other peripheral devices or an EMS page frame.

The third basic area of memory is extended memory 511, which includes all memory above 1M. Since the 8088/8086 microprocessors have only a 20-bit address bus, they can only address 1M of memory and cannot easily support extended memory 511. Microprocessors with a 24-bit addressing capability, such as the 80286, can address up to 16M of memory, including 15M of extended memory 511 in addition to the 1M of reserved memory 503 and conventional memory 502. Microprocessors which have a 32-bit addressing capability, such as the 80386 and 80486, can address up to 4G of memory, which includes 4095M of extended memory 511 in addition to the 1M of reserved memory 503 and conventional memory 502.

The area of extended memory 511, located just above 1M, is sometimes referred to as the high memory area 513. The high memory area 513 consists of the 65,520 memory bytes or words which are addressable using the high memory technique of the prior art.

A disadvantage of the prior art memory mapping system of FIG. 5 is that only 1 megabyte of memory is directly accessible. Of that 1 megabyte, an artificial limit of 640K has been set for RAM addressing. Often, a user requires more than 640K of RAM to be directly addressable. Because the artificial 640K limit of RAM addressing cannot be changed, prior art attempts to provide additional RAM are focused on utilizing the 384K of reserved memory between the RAM cutoff and the 1 megabyte limit. A number of these prior art methods are described below.

Prior Art

The first prior art method involves allocating the reserved memory 603 immediately above the 640K limit of conventional memory 602 for use as additional conventional memory. Referring to FIG. 5, the reserved memory address space from 640K to 704K, illustrated as element 601, is allocated for the EGA/VGA video frame buffer. The reserved memory from 704K to 736K is allocated for the MDA/Hercules video frame buffer. The reserved memory address space from 736K to 768K is allocated for the CGA video frame buffer. However, most computer systems have only one type of video display adaptor. If a computer system has a CGA or MDA/Hercules video adaptor, but does not have a EGA/VGA video adaptor, the memory allocated for the EGA/VGA video frame buffer from 640K to 704K, illustrated as element 601, remains unused and may be reallocated for use by an application program as an extension of conventional memory 602. If a computer system has only a CGA video adaptor and does not have a MDA/Hercules or EGA/VGA adaptor, the memory space allocated for the MDA/Hercules and EGA/VGA video frame buffers from 640K to 736K remains unused, and conventional memory 602 can be extended through 736K.

In order to push the limit of conventional memory 602 beyond 640K, the type or types of video display adaptors installed on the system must first be determined. Depending upon the types of video display adaptors present, an appropriate amount of unused RAM from external memory must be mapped into any unused address space which is greater than but contiguous with 640K. Then, the memory allocation procedures for providing memory to application software and TSR's must be modified to allow the memory beyond the 640K limit to be allocated.

Although this method does increase the amount of easily accessible memory, it has a number of disadvantages. First, it is not useful in computer systems with EGA or VGA displays, which are increasingly popular. Second, even in systems without EGA or VGA displays, only a limited amount of memory can be made available by this method. In systems with MDA or Hercules displays, only 64K can be made available. Even in systems with only a CGA display, only 96K can be made available.

Figure 6:
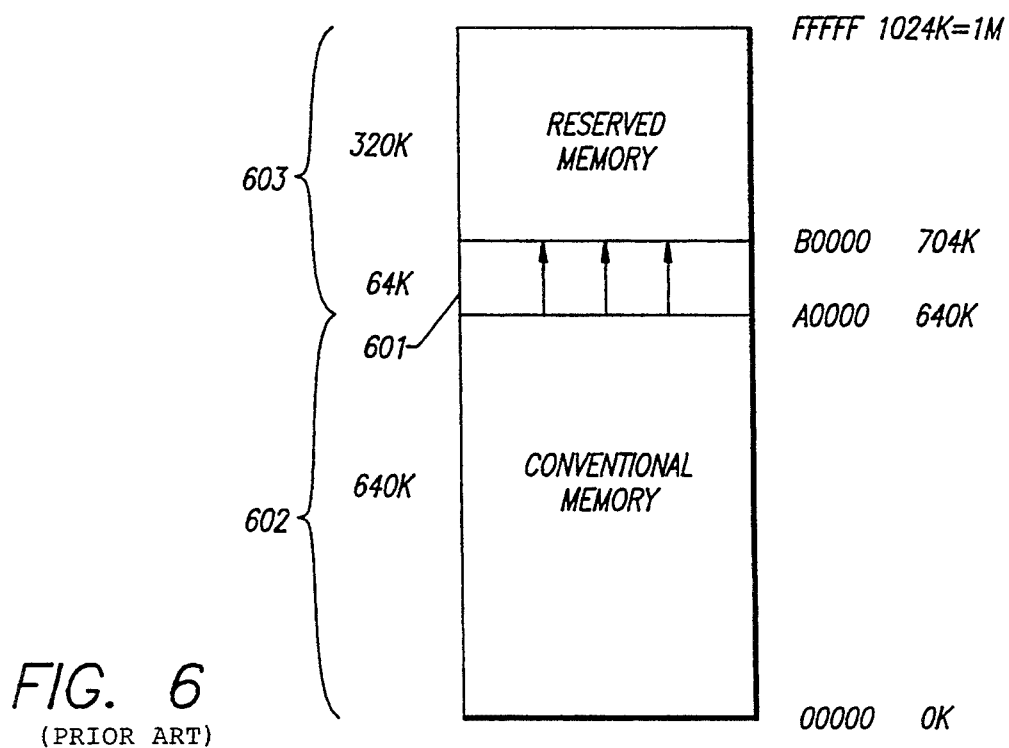
FIG. 6 is a memory map illustrating the first method of the prior art.
Figure 7:
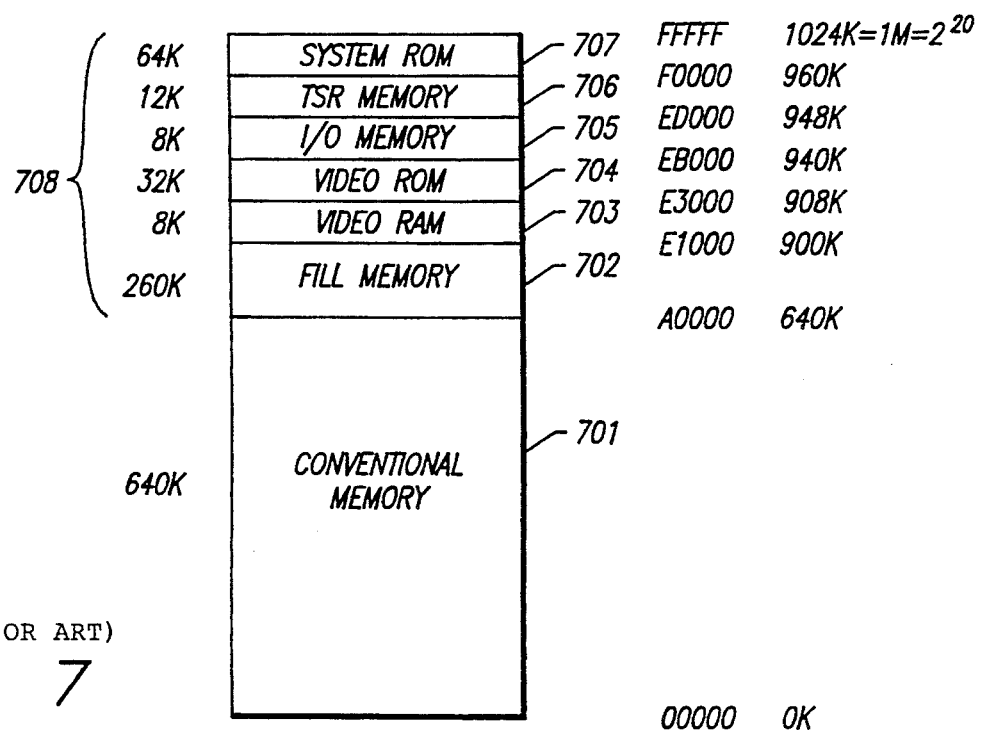
FIG. 7 is a memory map illustrating the second method of the prior art.

A second prior art method is similar to the first. It also involves pushing up the 640K limit of conventional memory into the reserved memory area, as illustrated in FIG. 6. However, it differs from the first prior art method in that it also provides for a relocation of reserved memory which is being used for other purposes. A memory map resulting from the user of this method is illustrated in FIG. 7. With this method, the video RAM 703 and video ROM 704, as well as other input/output (I/O) memory 705 and TSR memory 706 is relocated within the reserved memory area to memory locations which are as high as possible to allow as much unused reserved memory address space as possible to be available contiguous to the 640K boundary with conventional memory 701. In practice, the 640K limit of conventional memory 701 can be pushed up to as far as 900K.

To implement this method, the type of video display adaptors installed in the system must be determined. Other I/O devices which also occupy part of the reserved memory area 708 must also be determined. Then, the video RAM 703, video ROM 704, and any other I/O memory 705 and TSR memory 706 must be remapped to the area just below the system ROM 707 at the top of the reserved memory area 708. Then, all interrupts and other pointers to the video RAM 703, video ROM 704, I/O memory 705 and TSR memory 706 must be redirected to reflect the new memory space to which this memory has been relocated. Next, an appropriate amount of unused RAM from external memory must be mapped into the available block of reserved memory address space contiguous with 640K. Finally, the memory allocation procedures for application software and TSR's must be modified to allow allocation of the portion of reserved memory, referred to as fill memory 702, above 640K which has been made available.

This second prior art method also has disadvantages. It allows access to, at most, 260K of reserved memory. Also, since video RAM 703 is often accessed directly by application software, it is difficult to catch all of the attempted accesses and redirect them to the memory space in which the video RAM 703 has been relocated.

Figure 8:
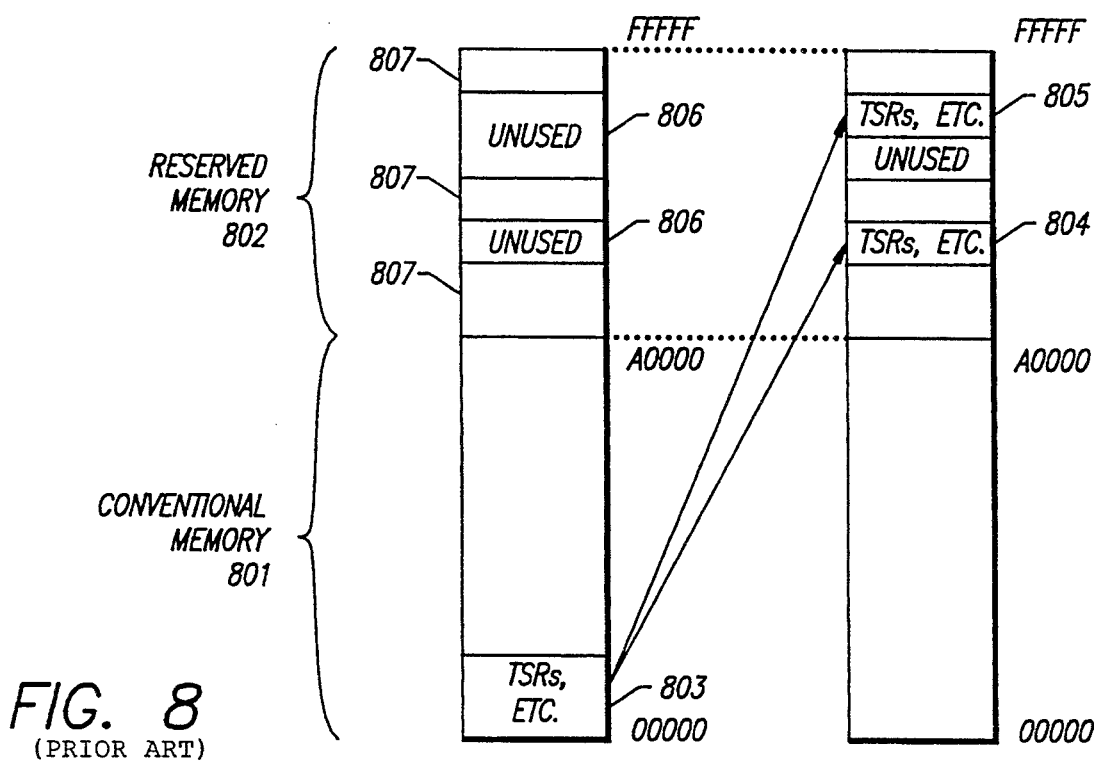
FIG. 8 is a memory map illustrating the fourth method of the prior art.

A third prior art method operates somewhat differently than the first two. It is illustrated in FIG. 8. Since TSR's, device drivers and network interface programs 803, which are normally located in conventional memory 801 below 640K, occupy some of the conventional memory space which could otherwise be used by application software, more memory would be available for applications software if these programs could be moved to memory outside of conventional memory 801. The third prior art method increases the amount of conventional memory 801 available for application software by moving TSR's, device drivers and network interface programs 803 from conventional memory 801 to reserved memory 802.

To implement this method, the amount of unused reserved memory 806 must first be determined. Also, the amount of conventional memory occupied by TSR's, device drivers and network interface drivers 803 must be determined. Then, a sufficient amount of unallocated RAM from extended memory must be mapped into the reserved memory area to provide memory space for the TSR's, device drivers and network interface programs. Next, the TSR's, device drivers and network interface programs 803 must be relocated to the available memory 806 in the reserved memory area 802.

The third prior art method also has disadvantages. First, it can use only unallocated reserved memory space 806. It cannot use reserved memory space 807 which has been allocated to ROM's, video frame buffers, or other uses.

Figure 9:
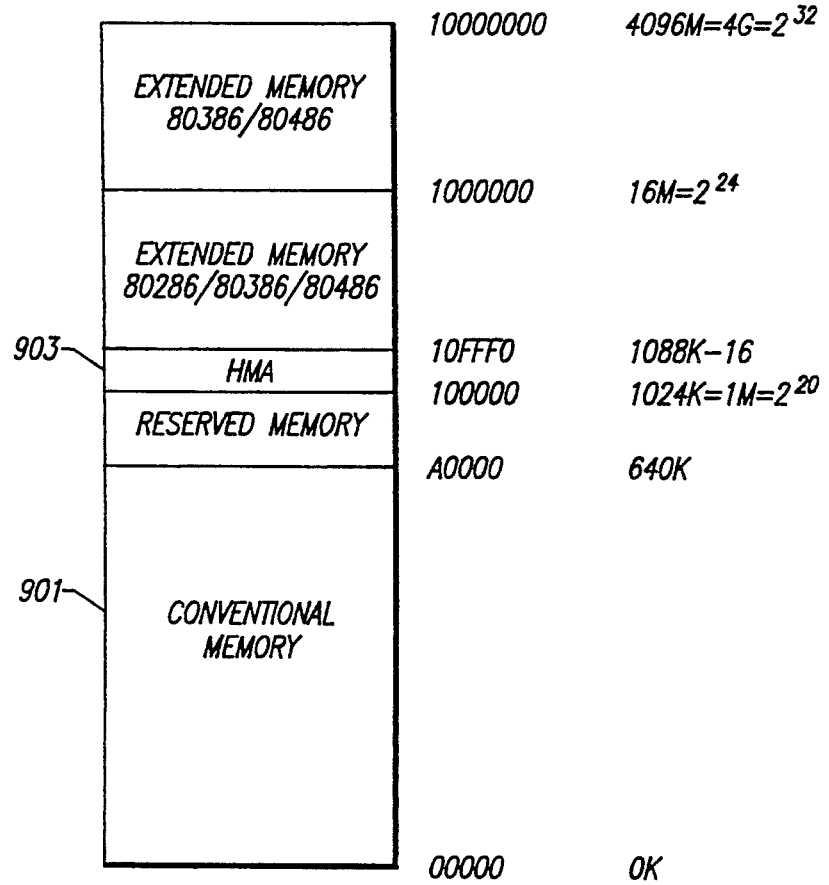
FIG. 9 is a memory map illustrating the third method of the prior art.

A fourth prior art method relates to what is called the high memory area. A memory map resulting from the use of this method is illustrated in FIG. 9. This method is based on an anomaly in the segmented addressing scheme as implemented on the 80286. The segmented addressing scheme involves combining a 16-bit segment with a 16-bit offset to produce a 20-bit address. Although a 20-bit address should theoretically be limited to 1M, certain combinations of segments and offsets can result in addresses which extend beyond the 1M limit. Although the 8088 and 8086 microprocessors were designed to limit the range of possible addresses to 1M, the 80286 microprocessor does not have such a protective mechanism. Since the 80286 microprocessor does not strictly maintain the 1M limit on memory addresses, this method may be used with the 80286 microprocessor to allow access to an additional 64K of memory, known as the high memory area (HMA) 903, located just above 1M.

To use this method, a register, known as the "segment register" and used to store the first 16 bit segment when a segmented addressing scheme is utilized, is first loaded with FFFFH. Then, a register known as the "offset register" is loaded with a value between 10H and FFFFH. Then, the microprocessor performs a high memory access as if it were an access to conventional memory 901.

This fourth prior art method has disadvantages associated with it. Since this method will not work with computers based on the 8088 or 8086 microprocessors, it cannot be used on early PC's or compatibles. Also, the amount of memory provided by this method is limited to 64K. Furthermore, application software must be specifically written to allocate and access the HMA and must not violate the restrictions on accessing the HMA, including restrictions on segment arithmetic and disk reads and writes directly into the HMA. In addition, this method is widely known and software has been written which uses this method to obtain more memory, so the memory provided by this method is probably unavailable for other uses in most computer systems.

Figure 10:
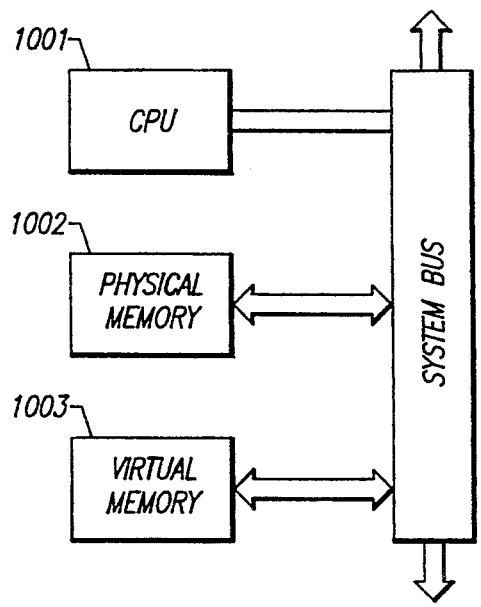
FIG. 10 is a block diagram illustrating the structure of a typical computer system employing the fifth method of the prior art.
Figure 11:
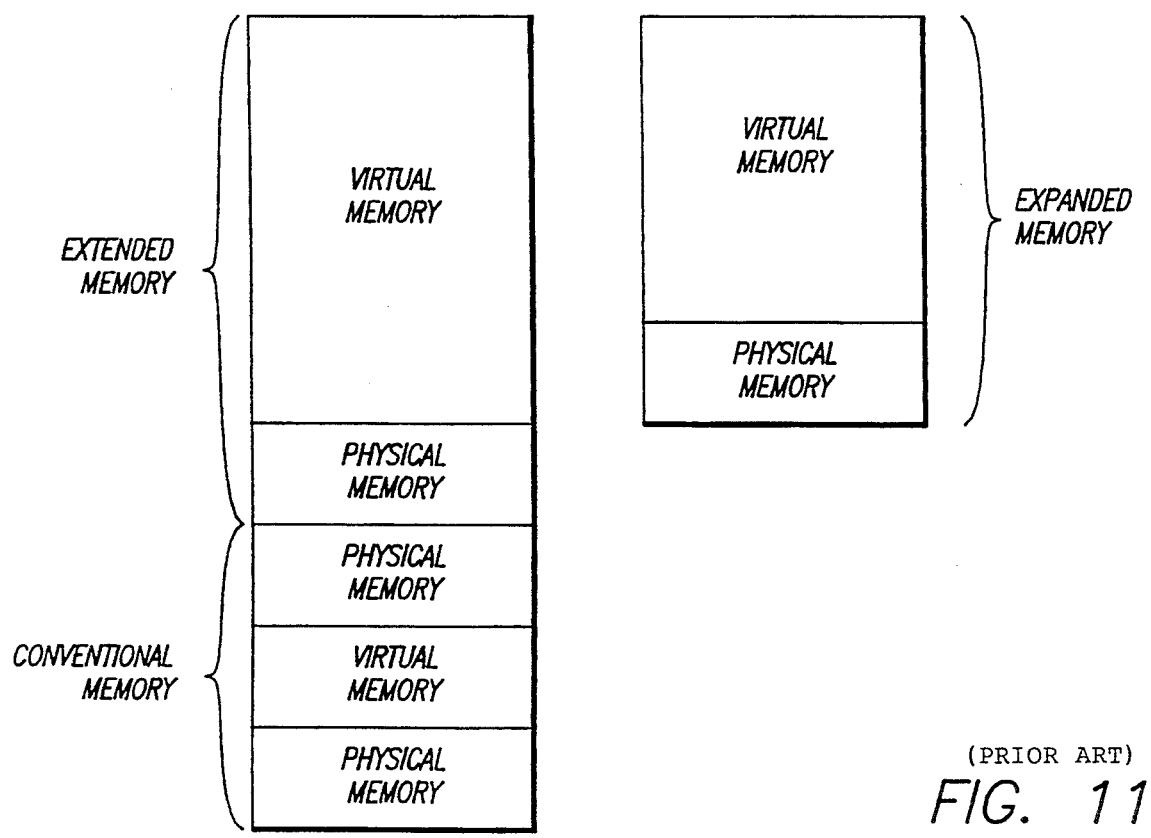
FIG. 11 is a memory map illustrating a possible organization of memory in a computer system employing the fifth method of the prior art.
Figure 12:
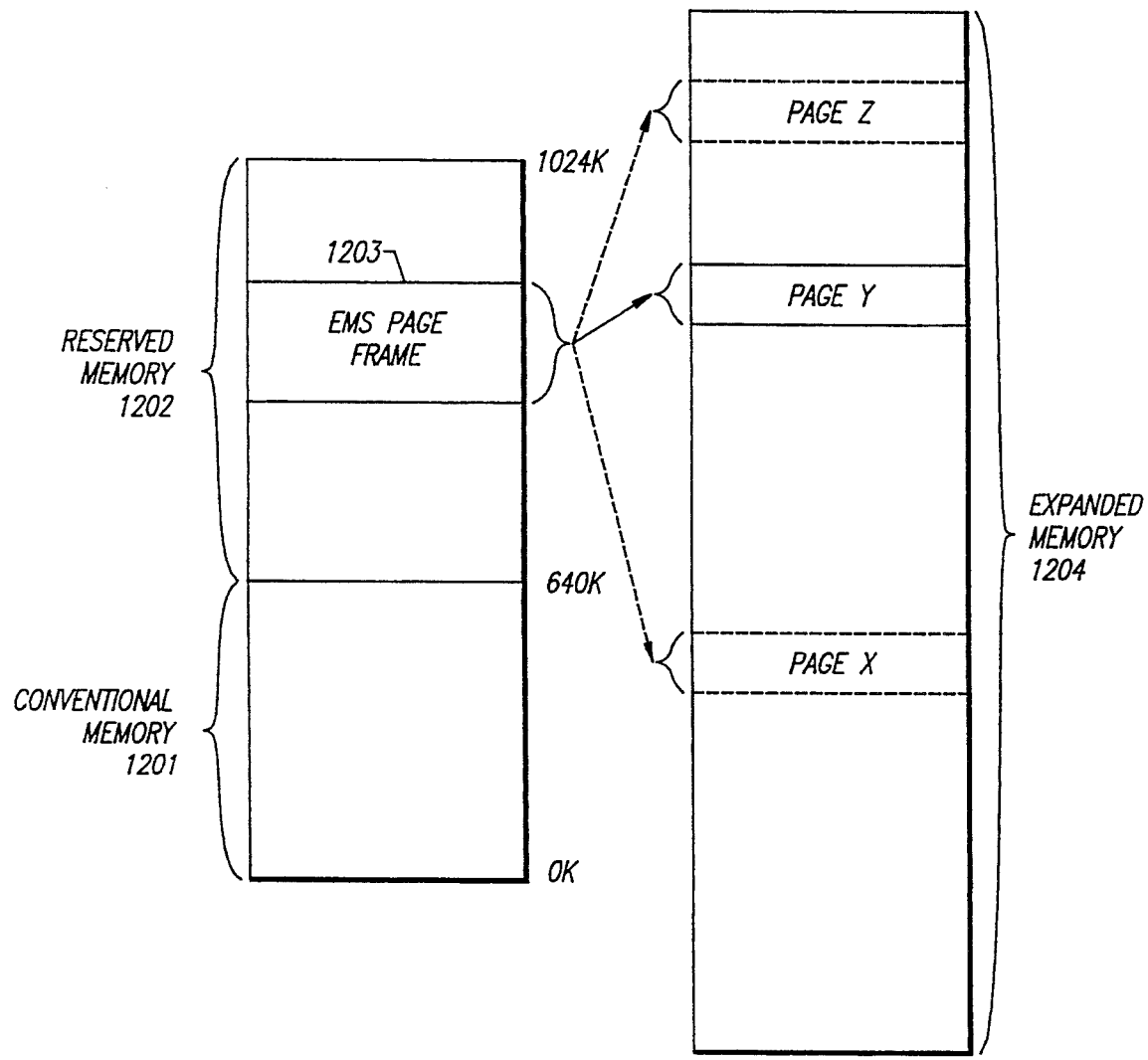
FIG. 12 is a memory map illustrating the fifth method of the prior art.

A fifth prior art method involves dividing memory into pages and ensuring that the page containing the desired data is in accessible memory at the time it is accessed. There are two variations of this method. The first is called the expanded memory specification (EMS). EMS is illustrated in FIG. 12. EMS bank switches pages from a non-directly-accessible memory pool into the page frame 1203 in the reserved memory area 1202 to allow the use of large amounts of non-directly-accessible memory, even though only one or a few pages are in the memory space below 1M at any given time. This non-directly-accessible memory may be extended memory or memory on an expanded memory board or elsewhere, but, when managed by an EMS manager, it is referred to as expanded memory 1204. When used with EMS, extended memory is referred to as expanded memory 1204. The second variation is called virtual memory. Virtual memory is illustrated in FIG. 10. One possible memory map of a system with virtual memory is shown in FIG. 11. Virtual memory allows information which cannot be contained in physical memory 1002 to be stored on an I/O device such as a hard disk drive. The data are divided into pages and are loaded from the disk drive into physical memory only when needed by the CPU 1001. Thus, large numbers of pages of data may be stored on the hard disk, while only a few pages need to be held in physical memory 1002.

To use EMS, the expanded memory 1204 must be divided into pages. Also, an area in reserved memory must be allocated for use as a page frame 1203. A directory of pages, including their contents and their location in expanded memory 1204, must be maintained. Once EMS is initialized and operational, software which supports EMS must monitor memory accesses to ensure that the desired EMS data is in EMS page frame 1203. If the desired EMS data is not in EMS page frame 1203 at the time of the access, the software which supports EMS must determine which page or pages of the page frame 1203 are to be bank switched out of the page frame to make room for the desired data. Then it must find the appropriate page from the expanded memory 1204. The appropriate page must then be loaded into the available page of the page frame 1203. Then the memory access must be redirected to the proper address within the page frame 1203 so as to allow the desired data to be read or written.

To use a virtual memory system, virtual memory 1003 allocated on the hard disk must be divided into pages. A directory of pages, including their contents and their location in memory must be maintained. Once the virtual memory system is initialized and operational, it must monitor memory accesses to ensure that the desired data is in physical memory 1002. If the desired virtual memory data is not in physical memory 1002 at the time of the access, the virtual memory system must determine which page or pages of memory are least likely to be accessed in the future and must store them back to the hard disk. Then it must find the appropriate page from the hard disk virtual memory 1003. The appropriate page or pages must then be loaded into the selected page or pages of physical memory 1002. Then the memory access must be redirected to the proper address within the newly loaded page or pages so as to allow the desired data to be read or written.

Although EMS and virtual memory systems have similarities, virtual memory systems generally operate much more automatically and transparently to applications software than does EMS. Applications software may not even be aware that a virtual memory system exists and is active on a computer system, while applications software must not only recognize the existence of EMS, but must specifically support EMS and direct the operation of EMS.

Although this fifth prior art method is theoretically capable of allowing access to increased amounts of memory, it also has disadvantages. Memory access times are increased with this method since CPU time must be devoted to memory management. Records must be continually updated to show the location of pages both in the page frame 1203 and in expanded memory 1204 and also their contents. These operations take away from time which the CPU could be devoting to other tasks and, therefore, reduce performance.

A sixth method of the prior art involves compression and optimization of ROM's. This method cannot be applied generally, but must be manually performed on each revision of each ROM. The object of this method is to reduce the amount of memory space occupied by the ROM's so that memory space allocated to, but unused by, the ROM's can be reallocated for other purposes. The memory space occupied by the ROM is reduced by finding and eliminating inefficient coding and portions of the ROM which are never accessed.

Since this method must be applied differently to each particular ROM, the details of the method cannot be described in general. To use this method, one must carefully examine the existing ROM code and data and locate any areas which should be changed or eliminated. Then, after these changes have been made, the ROM code and data must be reassembled. The new, smaller ROM code must then be mapped on top of part of the original ROM. Also, provisions must be made to allocate the memory space made available by this method to be used for other purposes.

The obvious disadvantage of this method is that it cannot be applied generally. Products based upon this method will become obsolete as soon as a new ROM revision is released. Also, significant amounts of time, effort and skill are required to perform the compression and optimization of each revision of each ROM.

A seventh prior art method involves temporarily providing additional memory in the reserved memory area for the initialization of TSR's which are to remain resident in the reserved memory area. By placing TSR's in memory which has been mapped into the reserved memory area, the conventional memory space which they would have otherwise used can be used by applications software. However, TSR's typically require more memory while they are being initialized than while they merely remain resident. Sometimes, such as when EMS is installed and its page frame occupies memory space in the reserved memory area, there may not be enough available reserved memory space to allow certain TSR's to be initialized. This method of the prior art overcomes this problem by borrowing space front the reserved memory space allocated for the EMS page frame. After the TSR completes its initialization and the space is no longer needed, the space is returned to EMS.

This prior art method also has disadvantages. First, the method is applicable only to TSR's. Some systems may have no TSR's or only a few TSR's and may benefit little from this method. Also, the amount of benefit derived from this method varies depending on the specific TSR. If a TSR does not require additional memory for initialization, little benefit can be derived from this method.

An eighth method of the prior art involves use of the LOADALL command to run real mode programs in the protected mode of the 80286 microprocessor. Its purpose is to emulate EMS despite the fact that the 80286 microprocessor has no inherent memory mapping capabilities in real mode. When the real mode program attempts to load segment registers, general protection exceptions occur. This method uses a general protection exception handler to translate the segment register into a selector so as to make the unexpected processor mode transparent to the program. To provide these capabilities on the 80286 microprocessor, the present invention relies on the LOADALL command.

The LOADALL command is an undocumented and unsupported feature of the 80286 microprocessor. It is not supported by the 8088, 8086, 80386 or 80486 microprocessors. It was apparently implemented in the 80286 microprocessor only as an aid to manufacturing and testing of the microprocessor. Thus, there is no guarantee that the LOADALL instruction will be supported even by 80286 microprocessors produced in the future. The LOADALL instruction was never intended for use in systems nor application software.

To use the eighth method of the prior art, the following procedure must be performed. First, the interrupts must be disabled. Second, 102 bytes beginning at location 00800H must be saved. Third, all registers must be saved. Next, the desired register values, including the descriptor cache base addresses specifying the area of external memory to be accessed, must be loaded into the 102 bytes of memory beginning at location 00800H. After this, the LOADALL opcode (0FH 05H) must be executed. Then, the registers are restored, and control is returned to the application. The next time a segment register is loaded, a fault occurs and this procedure is repeated.

The eighth method of the prior art has many disadvantages. First, the LOADALL instruction works only on 80286-based computer systems, not on 8088, 8086, 80386 or 80486-based computer systems. Since the LOADALL instruction is undocumented and unsupported, there is no guarantee that the LOADALL instruction will work on 80286 microprocessors produced in the future. It is generally unacceptable practice to rely upon undocumented or unsupported hardware features. Furthermore, the LOADALL instruction requires the manipulation of data at the absolute memory address 00800H. Unless measures are taken to ensure the preservation of the data in this area of memory before the LOADALL instruction is executed, the system software could be damaged. Also, this method results in general protection exceptions during all types of system operations. These exceptions must be serviced, which costs CPU time, thus substantially degrading system performance most of the time.

Another method of the prior art relates to the 16K RAM card which is used with the Apple II computer. The Apple II computer is based on the 6502 microprocessor. The 6502 microprocessor has a 16-bit address bus, which supports 64K of address space. However, because of the high cost of RAM devices at the time the Apple II was introduced, only the lower 48K of address space was intended for use with RAM. Above the 48K of RAM was a 4K area devoted to I/O memory. The remaining 12K, located at the highest area of address space, was intended for use with ROM.

As application software began to require increasingly large amounts of RAM, a method was needed to extend RAM beyond the 48K limit. To increase the amount of RAM, the 16K RAM card was introduced. The 16K RAM card contained 16K of RAM which could be mapped into the upper 16K of the 64K address space, replacing the 4K of I/O memory and the 12K of of ROM. To allow the use of the additional 16K of RAM, the I/O memory and ROM first had to be removed from the upper 16K of address space. This removal could be accomplished by altering the address decoding logic associated with the memory devices. Then the 16K of RAM could be mapped into the 16K of address space by enabling its address decoding logic.

With the 16K RAM card enabled, the 64K of address space was filled with 64K of RAM. Neither the 4K of I/O memory nor the 12K of ROM were accessible at that time. Since the I/O memory and ROM were not available, the application software had to maintain complete control of the computer system while the 16K RAM card was enabled and ensure that I/O memory and ROM were re-enabled before releasing control. Also, the application software could not access I/O devices or ROM routines while the 16K RAM card was enabled. If the application software released control or attempted to access I/O devices or ROM routines while the 16K RAM card was enabled, the system would crash since the desired I/O devices and system ROM would not exist within the computer system's address space at that time. Since this method required such careful control and oversight by the application software, it was certainly not transparent to the operation of the application software. The application software had to be written to specifically recognize the existence of the 16K RAM card and to use its features carefully.

The present invention overcomes the limitations of this prior art method by providing a method for the re-use of ROM address space in a manner transparent to the application software. There is no need for the application software to be written specifically to support the present invention or even to be aware of its existence and operation. Thus, the present invention provides a much more useful and versatile way of re-using ROM address space than the prior art method did.

Present Invention

The present invention provides additional memory address space that can be used to support RAM by reallocating ROM memory addresses in the reserved memory area between 640K and 1 megabyte. The original memory addresses may then be used to address applications, TSR's, etc., stored in RAM.

By way of example, the preferred embodiment is described as applied to a computer system based on the 8088/8086 family of microprocessors (which also includes, but is not limited to, the 80286, 80386 and 80486 microprocessors) and operating under the MS-DOS or PC-DOS operating system. However, the application of the present invention is not limited to such a computer system. The present invention does not require a specific video display adaptor configuration, but works with all video display adaptors. In addition, the present invention does not support only specific revisions of specific ROM's, but is generally applicable to most ROM's. Furthermore, the present invention is not limited to use with specific application software, but may be used transparent to most applications software. Also, the present invention avoids substantial degradation of overall system performance. Thus, the present invention is a great improvement over the prior art methods of increasing the amount of available memory in a computer system.

Figure 13:
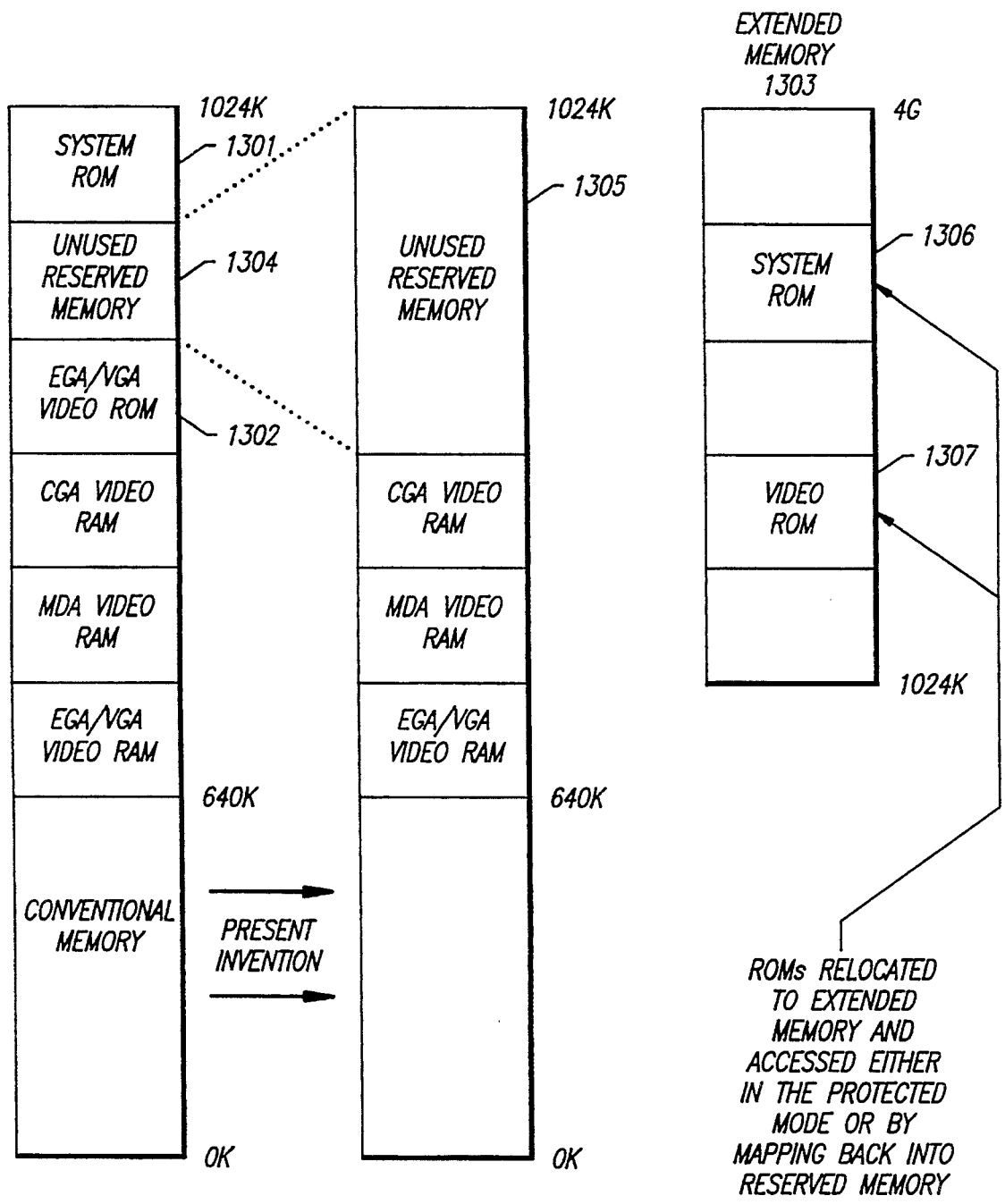
FIG. 13 is a memory map illustrating the protected mode embodiment and the mapping embodiment of the present invention.

Application of the present invention to a typical MS-DOS computer system is illustrated in FIG. 13. System ROM 1301 and video ROM 1302 are relocated into extended memory 1303, and the space they occupied is deallocated. Thus, the amount of unused reserved memory 1304 is increased to become unused reserved memory 1305. The present invention allows access to system ROM 1306 and video ROM 1307 either in the protected mode or by mapping back into reserved memory.

The present invention takes advantage of segmented addressing, "real" mode and "protected" mode of microprocessors that are used in computer systems. Segmented addressing and real and protected mode are described in detail below.

Figure 3:
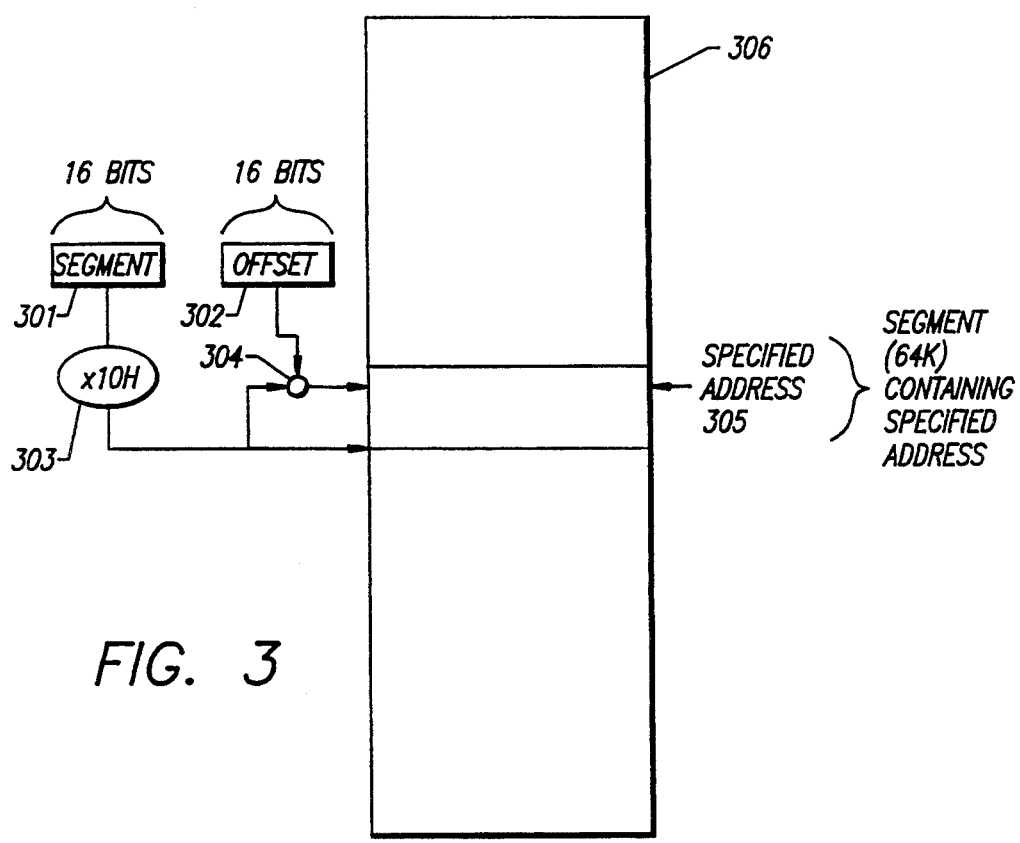
FIG. 3 is a diagram illustrating the addressing method used in the real mode of certain microprocessors.

Segmented addressing is illustrated in FIG. 3. In segmented addressing, an address is specified in two parts. The first part is referred to as the segment 301 and is a 16-bit binary value. The second part is referred to as the offset 302 and is also a 16-bit binary value. To determine the specified address 305 in physical memory 306 to be accessed, the microprocessor first performs a multiplication 303 of the contents of the segment register by 10H, which is equivalent to shifting it 4 bits to the left, then performs addition 304 of that value with the contents of the offset register. By shifting the segment register before adding it to the offset register, a 20-bit wide address is generated. The amount of memory accessible to the CPU through a 20-bit address bus is 2²⁰, which equals 1024K or 1M. This method of addressing is also used on the 80286, 80386 and 80486 microprocessors when they are operated in the "real" mode.

The 80286, 80386 and 80486 microprocessors may be operated either in the "real" mode or in the "protected" mode. The protected mode has a number of advantages not found in the real mode. First, on the 80286, the protected mode allows access to 16M, which is 16 times the amount of memory addressable in the real mode. On the 80386 and 80486, the protected mode increases the addressing limits even further. In the protected mode, the 80386 and 80486 can address 4096M, or 4G, which is approximately 4 billion memory bytes or words.

The present invention can be implemented in what is called a "protected mode" embodiment, or in what is called a "mapping" embodiment.

Protected Mode

Figure 4:
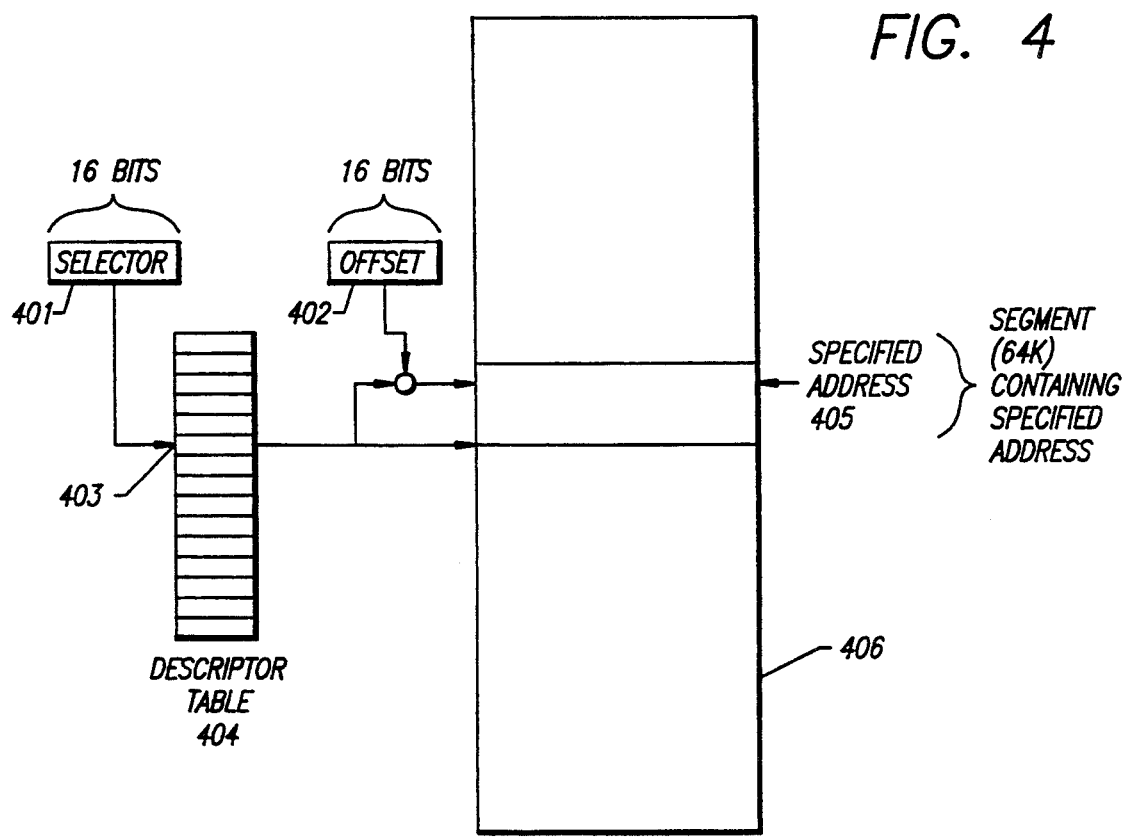
FIG. 4 is a diagram illustrating the addressing method used in the protected mode of certain microprocessors.

Addressing in the protected mode is illustrated in FIG. 4. Instead of a 16-bit segment register, the protected mode uses a 16-bit selector 401. The selector points to an entry 403 in a descriptor table 404. A descriptor table contains descriptors, which specify a base address. The 80286 descriptors provide a 24-bit base address, while the descriptors of the 80386 and 80486 provide a 32-bit base address. These base addresses serve the same function as the segments of the 8088/8086, but are more versatile. To determine the specified address 405 in memory 406 which is to be accessed, an offset 402 similar to that used in the 8088/8086 is added to the base address from the descriptor table 404.

The 80386 and 80486 have the additional capability of the "virtual 86 (V86)" mode. In the virtual mode, the address calculated by the microprocessor may not be the actual address placed on the address bus. When the 80386 or 80486 calculates an address in the virtual mode, it is calculating only a 32-bit linear address. The linear address is then passed to the microprocessor's paging mechanism, which performs additional calculation to determine the final address in physical memory. The paging mechanism allows memory to be mapped into a configuration different from that of the actual physical memory. By dividing physical memory into pages, the virtual mode allows each 4K block of physical memory to have its own virtual address. In the description below, the term "real mode" can be interchanged with "virtual mode." In the preferred embodiment, the present invention utilizes virtual mode.

The protected mode embodiment of the present invention allows reallocation of the memory space in the reserved memory area 503 which is originally allocated to the system and video ROM's 504 and 505. By reading from the ROM's in the protected mode, the present invention allows the ROM address space to be used for other purposes in the real mode.

The present invention is implemented by initializing the system configuration, reallocating the original ROM address space to make it available for other purposes, intercepting ROM accesses so that they may be directed to reallocated ROM address space, and handling the ROM accesses so that ROM accesses can be completed and the system can continue execution after the ROM access.

Figure 14:
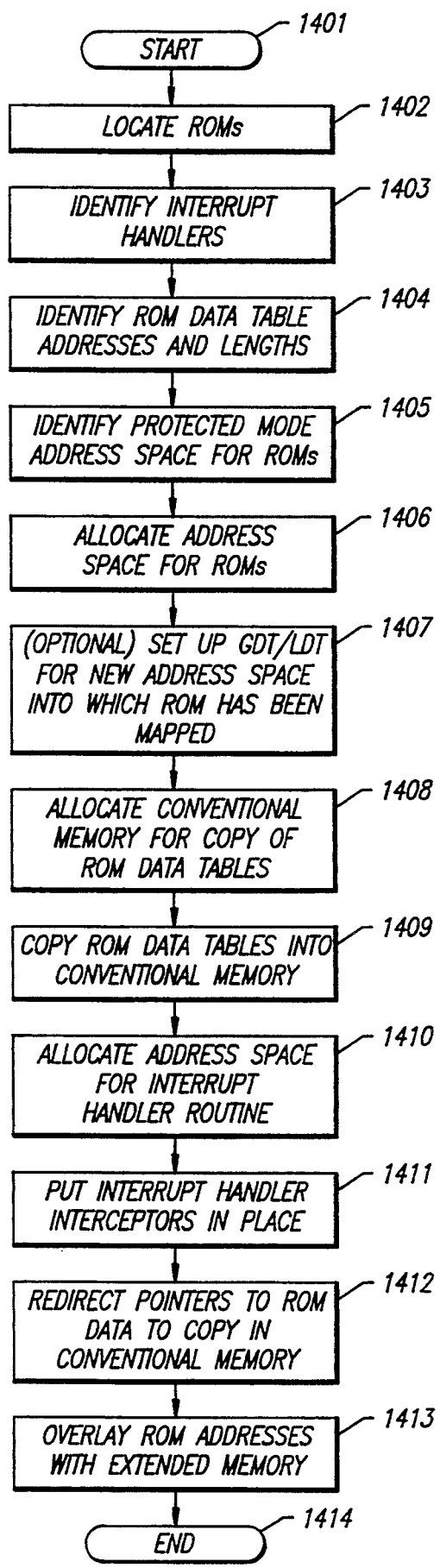
FIG. 14 is a flow diagram illustrating the initialization routine of the protected mode embodiment of the present invention.

The initialization of the computer system of the present invention is described in connection with the flow diagram of FIG. 14. The initialization routine begins at step 1401. At step 1402, the ROM's which are to be moved are located in their original address space in the reserved memory area 503 of FIG. 5. At step 1403, the interrupt handlers that will access ROM code are identified.

At step 1404, ROM data table addresses and lengths are identified. At step 1405, adequate unallocated protected mode address space is identified for use by the relocated ROM's. This address space must be contiguous and of adequate size to fully support ROM addressing. This address space is where the relocated ROM's will execute.

At step 1406, the identified address space in extended memory is allocated for ROM's so that conflicting use of the address space for other purposes is prevented. The ROM's are mapped into the allocated memory address space.

At optional step 1407, global and local descriptor tables (GDT/LDT) are preallocated for the new address space into which the ROM or ROM's have been mapped.

At step 1408, conventional memory is allocated to hold a copy of the ROM data tables. At step 1409, ROM data tables are copied into conventional memory. At step 1410, address space in conventional memory is allocated for the interrupt handler routine. At step 1411, the interrupt handler routine is then installed in the allocated address space. At step 1412, pointers to ROM data tables are redirected to the copy in conventional memory.

At optional step 1413, the ROM addresses are overlaid with extended memory. At step 1414, control is returned to the operating system.

If all of the references to the ROM data tables cannot be found or if it is desirable to avoid any chance that they cannot all be found, a variation of the above procedure may be performed. After any ROM data tables are located, either by reference to published information concerning their locations or by analysis of ROM contents, the portion of the original ROM address space which they occupy may be denoted as reserved for them. The ROM data tables are mapped into their original locations in the original ROM address space. The original ROM address space except for the portions occupied by the ROM data tables is deallocated to allow its use for other real-mode purposes. Adequate unallocated extended RAM must be found to fill the original ROM address space in reserved memory 503 which has been deallocated. This RAM is then allocated and mapped into the original ROM address space in reserved memory.

After all of the necessary steps have been taken to initialize the computer system for use of the protected mode embodiment of the present invention, the RAM which has been mapped into the original ROM address space in reserved memory 503 may be used for any of a variety of purposes, including the relocation of TSR's, device drivers or network interface programs. The new RAM will remain mapped into the original ROM address space during all phases of operation of the computer system, including during ROM calls.

The ROM access interceptor is present after the system has been reconfigured to allow reallocation of the original ROM address space in reserved memory 503. When any software on the system attempts to access the ROM, the ROM access interceptor must intercept the attempted access and activate the ROM access handler to ensure that the ROM code or data can be accessed. Since most ROM routines are accessed via software interrupts, the easiest way to intercept ROM accesses is to modify the interrupt table as described above. Since some application software may attempt to access the ROM directly without using interrupts, it is desirable to examine application software for references to ROM addresses and redirect these references so that they will access the new ROM image in extended memory.

Of course, if the alternative procedure described above of keeping the ROM data tables in their original locations is used, any ROM accesses which attempt to access the ROM data tables would be allowed to occur and would not be intercepted and redirected.

The ROM access handler provides a way to access the new ROM image in extended memory 511, to contain the ROM execution, and to restore the computer system to a condition where it can continue execution of the application software after the ROM access is completed.

Figure 15:
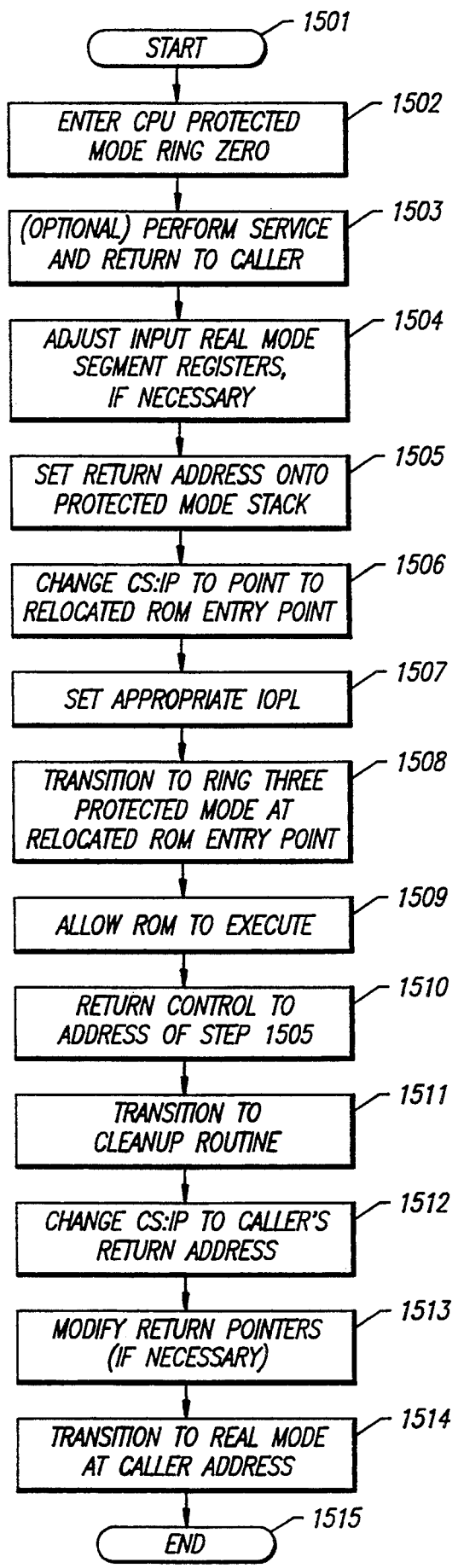
FIG. 15 is a flow diagram illustrating the initialization handler of the protected mode embodiment of the present invention.

A flow diagram illustrating the operation of the ROM access handler is illustrated in FIG. 15. The process begins at step 1501. At step 1502, the ROM access handler for the particular interrupt service routine being accessed causes the CPU to enter the protected mode at the level of protection known as ring zero. At optional step 1503, the service for the interrupt is performed without going to ROM and control is returned to the caller. If the optional step is not executed, continue as follows.

At step 1504, if necessary, the input real mode segment registers are adjusted to reflect the new protected mode selectors. At step 1505, an address for the ROM to return to is set onto the protected mode stack.

At step 1506, change ring three protected mode CS:IP to point to relocated ROM entry point. At step 1507, the appropriate IOPL is set. At step 1508, transition to ring three protected mode at relocated ROM entry point.

At step 1509, the ROM is allowed to execute, processing any faults there may be. At step 1510, the ROM returns control to the address set in step 1505. At step 1511, transition back to protected mode to cleanup routine.

At step 1512, change real mode CS:IP to point to caller's return address. If necessary, at step 1513, modify return pointers to point into redirected ROM data. At step 1514, transition back to real mode at caller's return address.

Mapping Embodiment

The mapping embodiment of the present invention also allows the address space in reserved memory 503 originally allocated to ROM's to be reallocated for other uses. However, the mapping embodiment of the present invention does not require use of the protected mode, and is therefore compatible with the 8088 and 8086 microprocessors, which do not support protected mode operations. Although the mapping embodiment of the present invention does not require the protected mode of the 80386 or 80486 microprocessors, it does require the ability to remap memory space. On the 80386 and 80486, this ability is provided by the V86 virtual mode. On 8088, 8086 and 80286 microprocessors, this ability may be provided either by an Expanded Memory Specification (EMS) board or by other memory management hardware capable of mapping over ROM address space.

Figure 16:
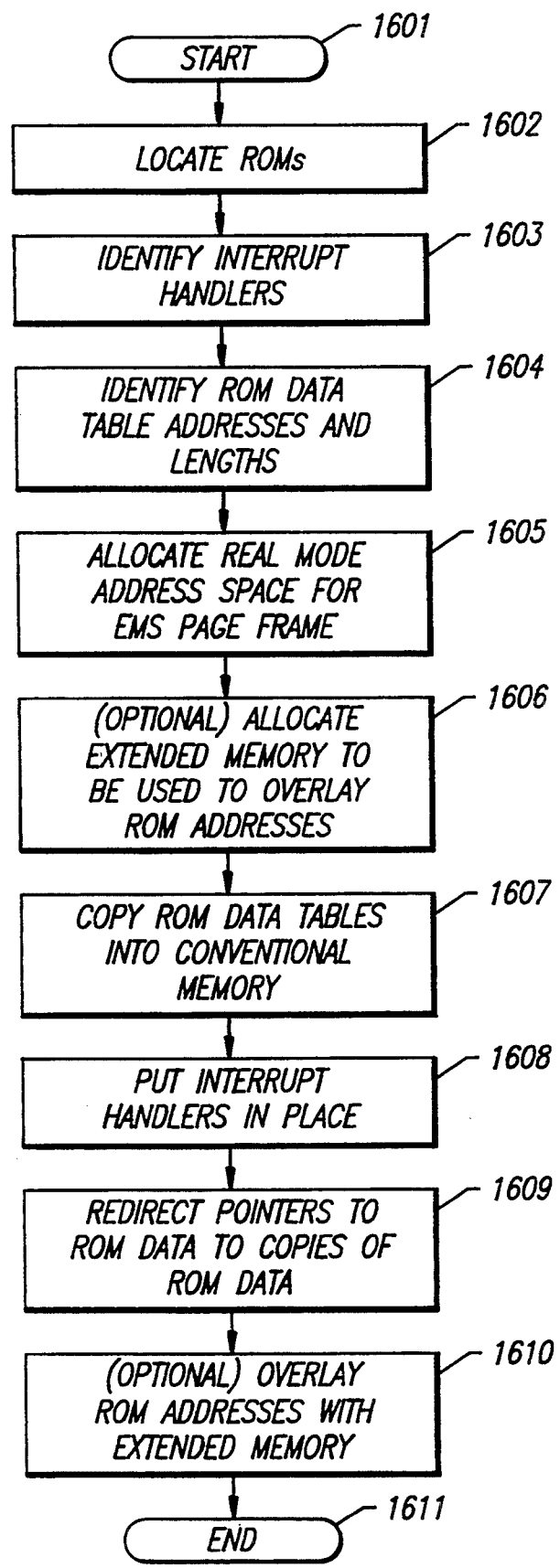
FIG. 16 is a flow diagram illustrating a mapping embodiment of the initialization routine of the present invention.

A flow diagram illustrating the mapping embodiment of the initialization routine of the present invention is illustrated in FIG. 16. The process begins at step 1601. At step 1602, the ROM's whose address space is to be reallocated are located.

At step 1603 the interrupt handlers that will access ROM code are identified. At step 1604, the ROM data table addresses and lengths are identified.

At step 1605, real mode address space for EMS page frame in which the ROM's will execute is allocated. At optional step 1606, extended memory to be used to overlay ROM addresses is allocated.

The data tables from ROM are copied into conventional memory at step 1607. At step 1608, the interrupt handler intercepts are put in place. At step 1609, pointers to ROM data are redirected to point to the copies of data in conventional memory. Optionally, at step 1610, the ROM addresses are overlaid with extended memory. Control is returned to the operating system at step 1611.

If all of the references to the ROM data tables cannot be found or if it is desirable to avoid any chance that they cannot all be found, a variation of the above procedure may be performed. After any ROM data tables are located, either by reference to published information concerning their locations or by analysis of ROM contents, the portion of the original ROM address space which they occupy may be denoted as reserved for them. The ROM data tables are mapped back into their original locations in the original ROM address space. Then the original ROM address space in reserved memory except for the space occupied by ROM data tables is deallocated to allow its use for other real-mode purposes. Adequate unallocated extended RAM must be found to fill the original ROM address space in reserved memory 503 which has been deallocated. This RAM must then be allocated. This RAM must be mapped into the deallocated ROM address space in reserved memory 503.

Once the initialization routine of FIG. 16 has been completed, the computer may be used normally, and the memory space which was originally occupied by the ROM's may be allocated for other uses, including relocation of TSR's, device drivers and network interface programs.

The ROM access interceptor of the mapping embodiment must intercept all instructions which reference the ROM's to prevent execution from going astray. Since most application software accesses ROM code via software interrupts, modification of the interrupt table allows calls to ROM code to be intercepted and redirected. It is also desirable to redirect references to ROM data tables, so software must be examined to locate any attempted accesses to the ROM data tables, and changes must be made to the ROM data table pointers to ensure that the accesses are redirected properly. If the alternative procedure described above of keeping the ROM data tables in their original locations is used, any ROM accesses which attempt to access the ROM data tables would be allowed to occur and would not be intercepted and redirected. When the ROM access interceptor intercepts an attempted ROM access, it passes execution to the ROM access handler.

Figure 17:
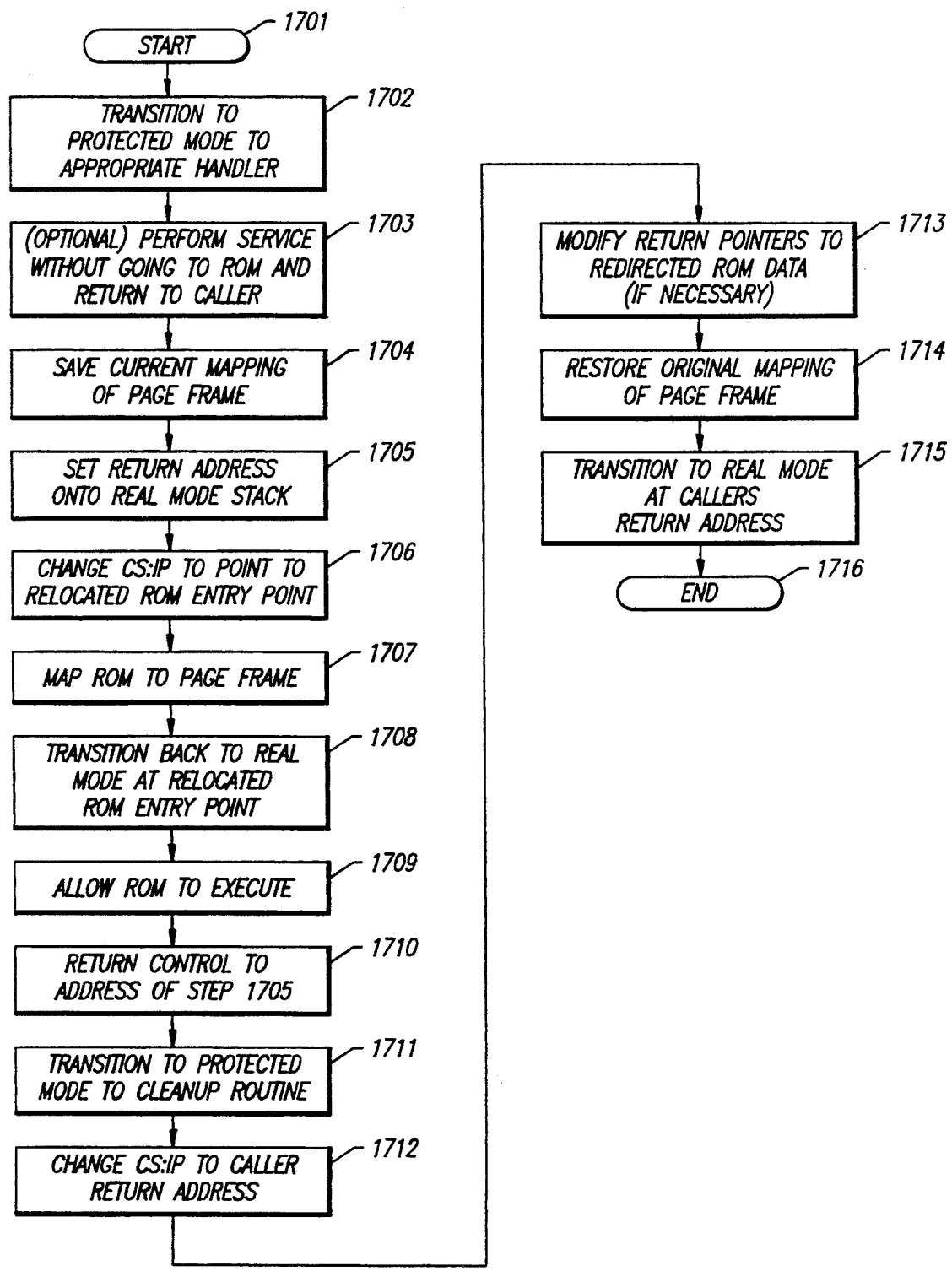
FIG. 17 is a flow diagram illustrating the mapping embodiment of the initialization handler of the present invention.

The mapping embodiment of the ROM access handler of the present invention is illustrated in the flow diagram of FIG. 17. The flow diagram begins operation at step 1701.

At step 1702, there is a transition to protected mode to the handler for the particular interrupt service routine being accessed. At optional step 1703, the service is performed without going to ROM and the system then returns to the caller. If optional step 1703 is not performed, the process continues as follows.

At step 1704, the current mapping of the page frame is saved, optionally on caller's real mode stack. At step 1705, an address for the ROM to return to is set onto the real mode stack. At step 1706, change real mode CS:IP to point to relocated ROM entry point. At step 1707, the ROM is mapped to the page frame. At step 1708, transistion to real mode at relocated ROM entry point. The ROM is allowed to execute at step 1709.

At step 1710, control is returned to the address set in step 1705. The system transitions back to protected mode to cleanup routine at step 1711. At step 1712, change real mode CS:IP to point to caller's return address.

If necessary, modify return pointers to point into redirected ROM data at step 1713. Original mapping of page frame is restored at step 1714, optionally from data saved on caller's real mode stack. At step 1715, the system transitions back to real mode at caller's return address.

Although implementation of the present invention using the CPU's protected mode offers a number of advantages, ROM's are normally operated in the real mode (or the V86 mode), not in the protected mode. To maintain compatibility with system software and applications software which expects ROM's to be accessed in the real mode, steps must be taken to simulate real-mode operation for ROM's which are accessed in the protected mode.

The present invention may be implemented to include a method for trapping attempts at loading the segment register. An attempt to load the segment register while the CPU is in the protected mode is detected by the CPU and automatically results in a call to the General Protection Exception Handler. The General Protection Exception Handler returns the location of the instruction which violated the rules of the protected mode.

To compensate for this occurrence, the instruction located at the location specified by the General Protection Exception Handler is examined and decoded. The decoding may be performed by looking up the opcode of the instruction on a look-up table which contains the opcodes of all instructions. By analyzing the instruction, the intended effect of the instruction in the real mode can be determined and the intended effect can be simulated in the protected mode. Since the intended effect is provided, the code that resulted in the fault can be made to work properly and execution may be passed back to that code to allow its completion.

To ensure that the present invention works properly, I/O instructions may be trapped, changing the I/O privilege level (IOPL) to a more privileged level (represented by a lower privilege level number) so that attempted execution of any IOPL-sensitive I/O instructions will result in a general protection exception fault. The resulting fault may be handled so as to ensure that it will not conflict with the operation of the present invention.

Although the interrupt flag on certain microprocessors usually works in a manner which requires little attention, the interrupt flag may work differently when I/O privileges are denied, such as when trapping I/O instructions. Certain microprocessor instructions which relate to the interrupt flag are I/O privilege level sensitive (IOPL-sensitive). In systems based on the 80286 or 80386 microprocessors, attempted execution of the CLI (clear interrupt enable flag) instruction or of the STI (set interrupt enable flag) instruction when I/O privileges are denied results in a general protection exception fault.

The present invention also includes a method for overcoming the difficulty of monitoring attempts by software to change the interrupt flag and of emulating proper interrupt flag behavior. These difficulties arise from the improper operation of the POPF and IRET (interrupt return) instruction in the protected mode. The POPF instruction is supposed to pop the topmost word off the stack and place its contents into the CPU's flags register. The IRET instruction is supposed to pop the top three words off the stack and places the third word contents into the CPU's flags register. However, in the protected mode, neither the POPF instruction nor the IRET instruction changes the interrupt flag nor generates a general protection exception. Thus, use of a general protection exception handler to emulate real mode behavior of the interrupt flag when the computer is in the protected mode will not provide complete emulation and will not result in proper operation.

In the past, no one has been able to provide satisfactory real mode emulation while in the protected mode because of the inability to trap POPF instructions. The *DOS Protected Mode Interface Specification, Version* 1.0 states, ". . . [C]lients cannot use IRET(D) or POPF to alter the interrupt flag, because these instructions access the physical interrupt flag and are ignored by the CPU due to the client's privilege level."

One feature of the present invention is to cause the POPF and IRET instruction to generate a general protection exception. The present invention provides proper emulation of real mode behavior while in the protected mode by trapping the POPF instruction or IRET instruction using an alternate method instead of relying solely on the general protection exception handler.

Since the POPF instruction or IRET instruction is usually used as part of a predictable sequence of code in a program, the present invention takes advantage of this regularity to trap the POPF instruction.

Normally, a program saves the contents of the flags register using the PUSHF instruction, locks interrupts using the CLI or unlocks interrupts using the STI instruction, executes miscellaneous code while the interrupts are locked, then restores the original contents of the flags register using the POPF instruction.

In order to trap the POPF instruction, the stack limit is set to be equal to the current stack pointer whenever a general protection exception resulting from the execution of a CLI or STI instruction occurs. With such a stack limit, execution of a POPF or IRET instruction causes the stack limit to be exceeded and thereby generates a general protection exception.

The present invention is not limited to computer systems having memory addresses mapped as shown in FIG. 5. For example, memory addresses reserved for ROM's may be at different locations. In a computer system such as PS/2, for example, memory addresses for ROM may be reserved at locations such as 0E000.

Although the present invention utilizes protected mode in the mapping method, this is not required. It is possible to use another memory management system that does not require that protected mode be entered for the mapping method.

Thus, a method to provide more available memory which is easily accessible in a manner which does not significantly degrade performance and which is not CPU-, ROM-, nor application-specific has been provided.

We claim:

1. A method for detecting execution of a first interrupt flag related instruction in a computer system having a processing means, a communication means coupled to said processing means, and a memory means coupled to said processing means through said communication means, said method comprising the steps of:
    detecting, using said processing means, an execution of a second interrupt flag related instruction that results in a general protection exception;
    adjusting, using said processing means, a stack limit of a stack in said computer system in response to said detecting step;
    causing a violation of said stack limit by executing in said computer system said first interrupt flag related instruction to attempt an access to said stack beyond said stack limit; and
    detecting, in said computer system, said violation of said stack limit caused by said access.

2. The method of claim 1 wherein said stack limit is adjusted to a present value of a stack pointer.

3. The method of claim 1 wherein said second interrupt flag related instruction is a clear interrupt instruction (CLI).

4. The method of claim 1 wherein said second interrupt flag related instruction is a set interrupt instruction (STI).

5. The method of claim 1 wherein said first interrupt flag related instruction is a pop flags (POPF) instruction that pops a plurality of stack entries from said stack.

6. The method of claim 1 wherein said first interrupt flag related instruction is an interrupt return (IRET) instruction that pops a plurality of stack entries from said stack.

7. The method of claim 1 wherein said violation of said stack limit results in a general protection exception.

* * * * *